United States Patent [19]
Oberjohn

[11] Patent Number: 6,135,029
[45] Date of Patent: Oct. 24, 2000

[54] LINEAR MOTION BRAKE

[75] Inventor: Karl W. Oberjohn, Minneapolis, Minn.

[73] Assignee: Nexen Group, Inc., Vadnais Heights, Minn.

[21] Appl. No.: 09/179,765

[22] Filed: Oct. 27, 1998

[51] Int. Cl.[7] .................................................. B60L 13/00
[52] U.S. Cl. ......................... 104/290; 104/252; 104/250; 188/62
[58] Field of Search ................................... 104/249, 252, 104/250, 290; 188/41, 43, 40, 44, 62, 23, 165

[56] References Cited

U.S. PATENT DOCUMENTS

| Re. 36,084 | 2/1999 | Gutknecht | 104/249 |
|---|---|---|---|
| 3,388,606 | 6/1968 | Hill . | |
| 3,535,944 | 10/1970 | Newstead . | |
| 3,705,554 | 12/1972 | Aksamit | 104/250 |
| 4,300,664 | 11/1981 | Helm et al. | 188/265 |
| 4,633,758 | 1/1987 | Kedzierski | 91/44 |
| 4,638,894 | 1/1987 | Sitabkhan et al. . | |
| 4,703,683 | 11/1987 | Sue | 92/24 |
| 4,779,787 | 10/1988 | Naruse et al. . | |
| 4,825,746 | 5/1989 | Herner | 91/45 |
| 5,111,913 | 5/1992 | Granbom . | |
| 5,184,700 | 2/1993 | Mainardi | 188/67 |
| 5,363,942 | 11/1994 | Osada . | |
| 5,377,788 | 1/1995 | Biewald et al. . | |
| 5,518,087 | 5/1996 | Hwang et al. . | |
| 5,524,548 | 6/1996 | Fox | 104/249 |
| 5,626,082 | 5/1997 | Nozaki | 104/252 |
| 5,829,811 | 11/1998 | Skinner, II | 294/88 |
| 5,967,051 | 10/1999 | Ragsdale et al. | 104/252 |

FOREIGN PATENT DOCUMENTS

| 2032625 | 7/1969 | Germany . |
|---|---|---|
| 0130400 | 3/1978 | Germany . |
| 659911 | 1/1964 | Italy . |
| 800447 | 1/1981 | Russian Federation . |
| 2175669 | 12/1986 | United Kingdom . |

*Primary Examiner*—Robert J. Oberleitner
*Assistant Examiner*—Devon Kramer
*Attorney, Agent, or Firm*—Alan Kamrath

[57] ABSTRACT

A brake (10) includes a first friction element (30) secured to the sliding plate (16) of a linear motor (12) and a second friction element (36) secured to the base plate (14) of the linear motor (12), with the friction elements (30, 36) located outside of the linear motor (12) in a direction generally perpendicular to the linear movement direction. The second friction element (36) includes first and second caliper elements (54) between which the first friction element (30) can be sandwiched and which are separated by movement of a release bar (62) parallel to the linear movement direction and including cam followers (72) which engage cam wedges (74) secured on the inner surfaces of the first and second caliper elements (54). The first and second caliper elements (54) are slideable upon standoffs (44) extending between side plate (42) of a frame (38). Wave springs (58) are positioned in recesses (60) and between the caliper elements (54) and the side plates (42) for biasing the caliper elements (54) together. The release bar (62) is moved by an actuator (70) secured to an end of the release bar (62) while the other end is slideably supported by a shaft hanger (64).

20 Claims, 2 Drawing Sheets

LINEAR MOTION BRAKE

BACKGROUND

The present invention generally relates to brakes, specifically relates to brakes for linear motion applications, and more specifically relates to linear motion brakes having special application to power-off situations.

The popularity of linear motors in the machine tool, semiconductor, and medical industries has been increasing as the result of their ability to move a load in a linear movement direction to a position with extreme accuracy and at very high speeds. However, problems have been encountered in stopping linearly moving loads especially in the event of a power outage. Specifically, as movement and positioning of the load is dependent upon current being supplied to the linear motor, loads carried by linear motors will move under gravitational and/or inertia forces in the event that current is interrupted to the linear motor such as the result of a power outage. This problem is also enhanced in linear motors because of the use of high performance linear bearings which minimize sliding friction.

Although marketing of linear motor packages is increasing in popularity, often the end user purchases the various components of linear motors such as linear bearings, armatures and magnet tracks or stators, and position feedback devices and arranges such components according to their particular application. Thus, linear motors have a variety of configurations.

Although linear motion brakes have been utilized in other fields such as roller coasters, attempts to provide brakes for stopping linear motion of loads driven by linear motors have not been commercially viable, possibly due to their relative small size.

Thus, a need exists for a brake for stopping linearly moving loads and especially for use with linear motors and particularly for use in stopping linearly moving loads in the event of a power outage, emergency stop, parking, or similar situation. In a preferred aspect, the linear motion brake must be adaptable for use with any configuration of a linear motor and in most preferred aspects is modular in form for attachment to the linear motor if and when braking is desired in the particular application of the linear motor.

SUMMARY

The present invention solves these needs and other problems in the field of brakes for linear motion applications by providing, in the preferred form, a brake having special application for use with a linear motor. In preferred aspects, the first and second friction elements are spaced from and parallel to the linear bearings and the armature and stator of the linear motor. In most preferred aspects of the present invention, the linear motion brake is located outside of the linear motor spaced in a direction generally perpendicular to the linear movement direction and in the preferred form parallel to the linear motor but offset from the linear motor.

In other preferred aspects of the present invention, the mechanism for separating first and second caliper elements from each other and from a first friction element is located between and presses against the inner surfaces of the first and second caliper elements to minimize the width of the linear motion brake in comparison to when actuation force is applied to the first and second caliper elements outside of the inner surfaces of the first and second caliper elements.

It is thus an object of the present invention to provide a novel brake for stopping linear motion.

It is further an object of the present invention to provide such a novel linear motion brake having special application for use with a linear motor.

It is further an object of the present invention to provide such a novel linear motion brake for use in the event of a power outage, emergency stop, parking or similar situation.

It is further an object of the present invention to provide such a novel linear motion brake adaptable for use with any configuration of linear motor.

It is further an object of the present invention to provide such a novel linear motion brake of a modular form.

It is further an object of the present invention to provide such a novel linear motion brake applying a constant engagement force at any position in the linear movement direction.

It is further an object of the present invention to provide such a novel linear motion brake having a small cross sectional size in directions perpendicular to the linear movement direction.

It is further an object of the present invention to provide such a novel linear motion brake utilizing mechanical advantage to reduce the input power requirements.

It is further an object of the present invention to provide such a novel linear motion brake easily adaptable to utilize different types of actuators.

It is further an object of the present invention to provide such a novel linear motion brake not requiring cable connection to the linearly movable component for actuation.

It is further an object of the present invention to provide such a novel linear motion brake having minimal effect on the dynamics of the linear motion.

It is further an object of the present invention to provide such a novel linear motion brake minimizing side loading of the linear bearings.

These and further objects and advantages of the present invention will become clearer in light of the following detailed description of an illustrative embodiment of this invention described in connection with the drawings.

DESCRIPTION OF THE DRAWINGS

The illustrative embodiment may best be described by reference to the accompanying drawings where.

Figure 1:
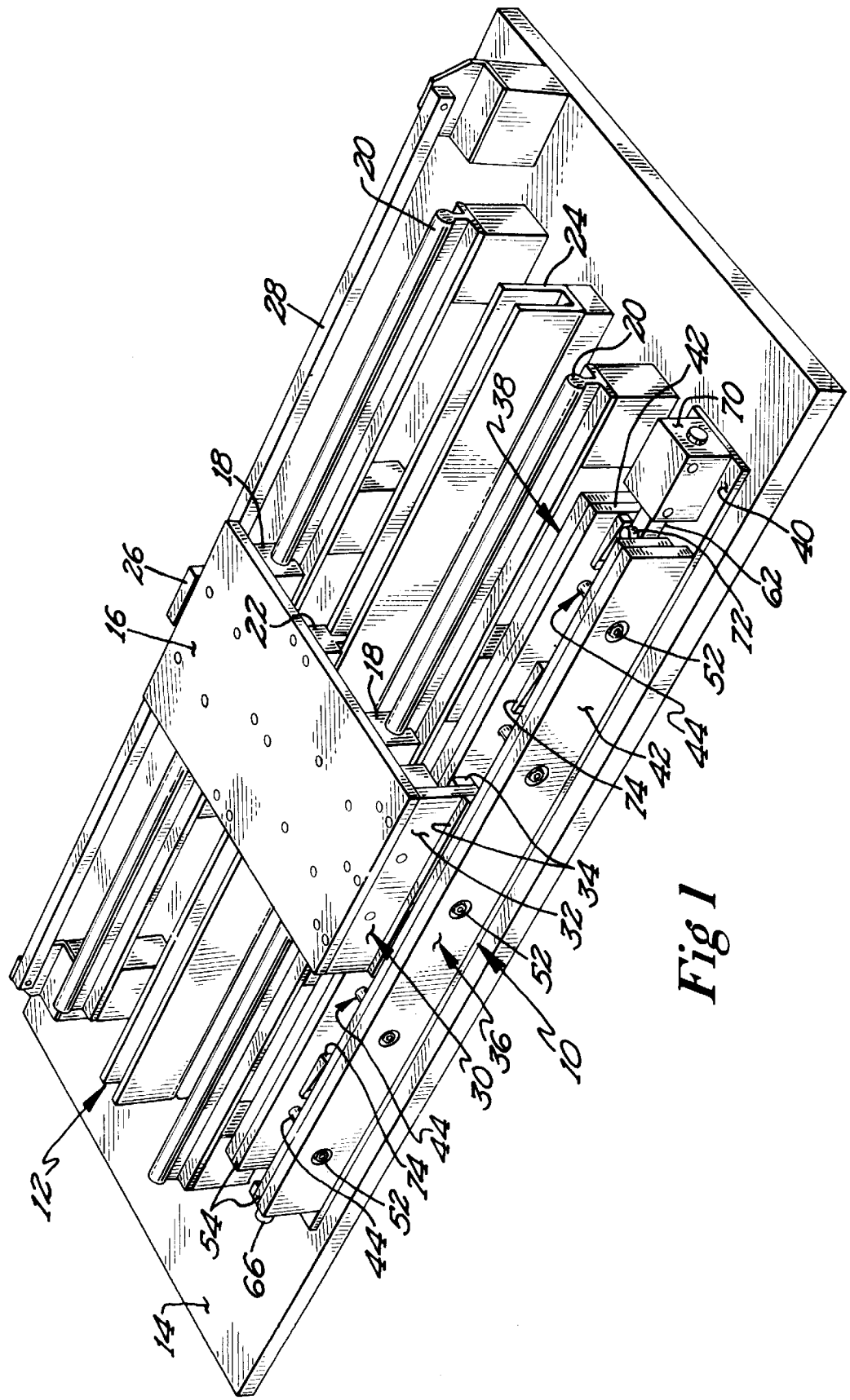
FIG. 1 shows a perspective view of a linear motor and a linear motion brake according to the preferred teachings of the present invention.
Figure 2:
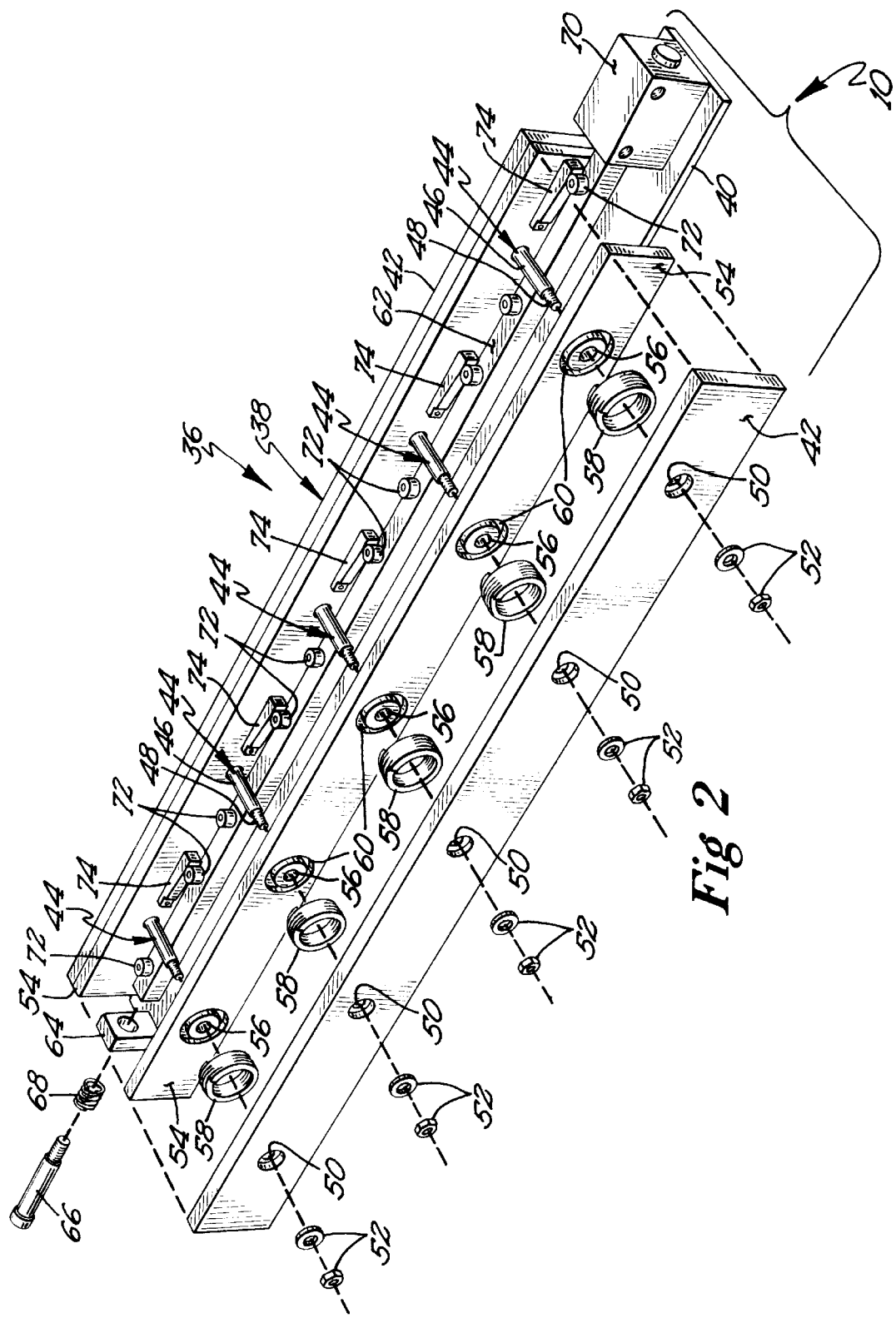
FIG. 2 shows an exploded perspective view of the linear motion brake of FIG. 1.

All figures are drawn for ease of explanation of the basic teachings of the present invention only; the extensions of the figures with respect to number, position, relationship, and dimensions of the parts to form the preferred embodiment will be explained or will be within the skill of the art after the following description has been read and understood. Further, the exact dimensions and dimensional proportions to conform to specific force, weight, strength, and similar requirements will likewise be within the skill of the art after the following description has been read and understood.

Where used in the various figures of the drawings, the same numerals designate the same or similar parts. Furthermore, when the terms "first", "second", "inside", "outside", "upper", "lower", "height", "width", "length", "end", "side", "horizontal", "vertical", and similar terms are used herein, it should be understood that these terms have reference only to the structure shown in the drawings as it would appear to a person viewing the drawings and are utilized only to facilitate describing the illustrative embodiment.

DESCRIPTION

A brake for stopping linearly moving loads according to the preferred teachings of the present invention is shown in the drawings and generally designated 10. Brake 10 in its most preferred form is shown for use with a linear motor 12 which can be of any conventional design including but not limited to the type shown. Generally, motor 12 includes a base plate 14 and a sliding plate 16 mounted for linear motion for a distance relative to base plate 14 such as by two or more linear bearings 18 slideable upon linear races 20 in a linear movement direction. In the preferred form, bearings 18 and races 20 are purchased components such as from LinTech of Monrovia, Calif. Sliding plate 16 is driven relative to base plate 14 such as by an armature 22 secured to sliding plate 16 which slides through a stationary stator shown in the preferred form as a magnet track 24 secured to base plate 14. In the preferred form, armature 22 and magnet track 24 are purchased components such as from Aerotech, Inc. of Pittsburgh, Pa. By selectively supplying electrical current to armature 22 and/or stator 24, armature 22 will move relative to stator 24 thus resulting in the linear movement of sliding plate 16 relative to base plate 14. Feedback of the position of sliding plate 16 relative to base plate 14 can be suitably supplied to the controller for electrical current supply such as by a reading head 26 secured to sliding plate 16 which slides or otherwise moves relative to a linear encoder scale 28 secured to base plate 14. In the preferred form, head 26 and scale 28 are purchased components such as from Acu-Rite, Inc. of Jamestown, N.Y.

It should be appreciated that linear motor 12 according to the teachings of the present invention can have a variety of configurations including but not limited to the one shown and described. For example, linear motor 12 could be installed in a preassembled stage including linear bearings and races 18 and 20, head 26, and scale 28 such as provided or offered by Bayside Corporation of New York. Additionally, although having particular application to linear motors 12 and believed to produce synergistic results therewith, brake 10 according to the teachings of the present invention may have application to other drives for providing linear motion including but not limited to ball screws, belt drives, air cylinders, and the like.

Brake 10 according to the teachings of the present invention generally includes a first friction element 30 mounted for movement with sliding plate 16. In the most preferred form shown, friction element 30 is in the form of a fin 32 removably secured to sliding plate 16 such as by screws and arranged generally parallel to and spaced from bearings 18. In the preferred form, the lower free edge of fin 32 includes linear friction pads 34 on opposite sides of fin 32.

First friction element 30 is linearly movable relative to a second friction element 36 mounted to base plate 14. In the most preferred form shown, friction element 36 includes a frame 38 which in the preferred form shown is U-shaped. In particular, frame 38 includes a central plate 40 and first and second side plates 42 extending generally perpendicularly from the opposite side edges thereof. Side plates 42 can be suitably secured to central plate 40 by any suitable manner such as by screws. Frame 38 can be suitably mounted relative to linear motor 12 such as but not limited to by securement such as by screws extending through central plate 40 and threaded into base plate 14.

A plurality of parallel, spaced, round standoffs 44 are provided including central portions 46 and reduced diameter threaded, male portions 48 extending from the opposite ends of central portions 46. In the most preferred form, standoffs 44 are purchased components such as from Accurate Screw Machine Co. of Fairfield, N.J. Threaded portions 48 extend through apertures 50 formed in side plates 42 spaced from central plate 40. Side plates 42 are sandwiched between central portions 46 and washer and nut arrangements 52 received on threaded portions 48. In the most preferred form, apertures 50 can be counterbored to inset arrangements 52 within the outer surfaces of side plates 42. Side plates 42 are arranged parallel to and spaced from linear races 20, with fin 32 extending between side plates 42 with pads 34 positioned intermediate the free edges of side plates 42 and central plate 40 above and adjacent to but spaced slightly on the opposite side of standoffs 44 than central plate 40.

Friction element 36 according to the teachings of the present invention in the preferred form shown generally includes first and second caliper elements 54 which are movably mounted relative to frame 38 in a direction generally perpendicular to the linear movement direction of sliding plate 16 and friction element 30 carried thereby. Particularly, in the preferred form shown, elements 54 include apertures 56 of a size and shape for slideable receipt on central portions 46 of standoffs 44, with apertures 56 including press fit bushings or other provisions for reducing sliding friction.

Brake 10 according to the teachings of the present invention further includes suitable provisions for selectively engaging and disengaging friction elements 30 and 36. Particularly, in the preferred form, caliper elements 54 are biased away from side plates 42 toward each other for sandwiching friction element 30 therebetween. Specifically, in the preferred form shown, a plurality of wave springs 58 are positioned between caliper elements 54 and side plates 42 allowing the spring force to be directly applied to caliper elements 54, eliminating costly linkages and allowing a more compact brake design. In the most preferred form, wave springs 54 are purchased components such as from Smalley Steel Ring Co. of Wheeling, Ill. In this regard, wave springs 58 have a longer diameter but a reduced working height in comparison to conventional coil springs. In the most preferred form, the outer surfaces of caliper elements 54 include annular recesses 60 arranged concentrically around apertures 56 and of a size for receipt of wave springs 58. Recesses 60 hold wave springs 58 in position relative to caliper elements 54 and side plates 42 and allow the outside surfaces of caliper elements 54 to flushly abut the inside surfaces of side plates 42. It should be noted that wave springs 58, standoffs 44 and apertures 56 extend along the same axes in the preferred form which is the ideal loading condition that minimizes binding of apertures 56 on central portions 46 of standoffs 44. It should also be appreciated that recesses 60 could be additionally or alternately provided in the inside surfaces of side plates 42 according to the teachings of the present invention. Likewise, caliper elements 54 could be moved toward each other in other manners including but not limited to other biasing manners according to the teachings of the present invention.

Further, in the preferred form, caliper elements 54 are mechanically pushed toward side plates 42 away from each other and from friction element 30. Specifically, in the preferred form shown, a release bar 62 is mounted relative to frame 38 for movement between engaged and disengaged positions in an actuation direction which is parallel to the linear movement direction of sliding plate 16 and friction element 30 carried thereby. Particularly, a shaft hanger 64 upstands from one end of central plate 40 and includes an aperture for slideably receiving a shoulder bolt 66 which is threadably received in the end of release bar 62. The aperture for slideably receiving shoulder bolt 66 can include a press fit bushing or other provisions for reducing sliding friction. A coiled spring 68 is optionally positioned on the shaft of shoulder bolt 66 and sandwiched between the head of shoulder bolt 66 and shaft hanger 64. A linear actuator 70 is suitably secured to the opposite end of release bar 62 for moving release bar 62 in the actuation direction. In the most preferred form, actuator 70 is pneumatically actuated such as supplied by Compact Air Products of Westminister, S.C. but can be actuated in any other manner including but not limited to electromechanically. It should be appreciated that release bar 62 is suspended above central plate 40 by hanger 64 and actuator 70 in the most preferred form to minimize sliding frictional forces.

In the preferred form shown, release bar 62 includes a plurality of cam followers 72 in the most preferred form of rollers, such as supplied by McGill, Emerson Power Transmission Corp. of Valparaiso, Ind., arranged in a series at equal spacing in the actuation direction. A plurality of cam wedges 74 are mounted on the inside surfaces of caliper elements 54 at positions corresponding to cam followers 72. Release bar 62, cam followers 72, and cam wedges 74 are located between the inside surfaces of caliper elements 54 below standoffs 44 and on the opposite side thereof than friction element 30, and in the preferred form with at least cam followers 72 and cam wedges 74 and in the most preferred form release bar 62 located exclusively between the inside surfaces of caliper elements 54. Wedges 74 include cam surfaces upon which cam followers 72 roll, with the cam surfaces extending at a nonparallel angle to the linear movement direction and having increasing spacing from the inside surfaces of caliper elements 54 and in the most preferred form are flat and planar. Wedges 74 are arranged such that cam followers 72 are located on the cam surfaces at their maximum spacing from the inside surfaces of caliper elements 54 when release bar 62 is in its disengaged position and such that cam followers 72 are located on the cam surfaces at their minimum spacing from the inside surfaces of caliper elements 54 when release bar 62 is in its engaged position. Thus, with release bar 62 in its engaged position, caliper elements 54 are moved under the bias of springs 58 to sandwich and clamp friction element 30 therebetween at any point in its travel in the linear movement direction. As friction element 30 is mounted to sliding plate 16, brake 10 according to the teachings of the present invention will apply a braking force against movement of sliding plate 16 relative to base plate 14 when release bar 16 is in its engaged position. As release bar 62 is moved from its engaged position to its disengaged position, cam followers 72 roll on wedges 74 and due to the increasing spacing of their cam surfaces, followers 72 and wedges 74 located between the inside surfaces of caliper elements 54 press against and place force against the inner surfaces of caliper elements 54 resulting in caliper elements 54 moving away from each other and from friction element 30. Thus, when release bar 62 is in its disengaged position, friction element 30 and sliding plate 16 is free to move relative to caliper elements 54, frame 38, and base plate 14 according to the teachings of the present invention.

In most preferred forms of the present invention where brake 10 is utilized to stop linearly moving loads in the event of a power outage, emergency stop, parking or similar situation, spring 68 biases release bar 62 to move from its disengaged position to its engaged position and helps brake 10 overcome friction and engage more quickly. Additionally, actuator 70 moves release bar 62 to its disengaged position when powered and allows release bar 62 to move to its engaged position when unpowered. Thus, in the event of a power failure, electrical current supply would be interrupted to armature 22 and/or stator 24 which would allow relative movement of base plate 14 and sliding plate 16 (without brake 10 according to the teachings of the present invention). Simultaneously, power would be interrupted to actuator 70 such that release bar 62 moves to its engaged position and friction element 30 is sandwiched between caliper elements 54 thereby braking movement of sliding plate 16 relative to frame 38 and base plate 14. It can be appreciated that if linear motor 12 (without brake 10 according to the teachings of the present invention) is vertically oriented and sliding plate 16 is vertically spaced from its lowermost position when a power failure occurs, sliding plate 16 will move downwardly under gravitational forces to its lowermost position as relative movement is not impeded by armature 22 and/or stator 24. Likewise, if sliding plate 16 is moving when a power failure occurs, sliding plate 16 will continue to move under inertia forces as relative movement is not impeded by armature 22 and/or stator 24 if brake 10 according to the teachings of the present invention is not provided. However, according to the teachings of the present invention, brake 10 will provide a braking force to sliding plate 16 at any point of its travel to prevent relative movement of sliding plate 16 and base plate 14 in the event of a power failure. It should also be appreciated that in the most preferred form, brake 10 is disengaged in normal operation of linear motor 12 and is engaged in only limited circumstances such that wear of pads 34 is minimal.

Now that the basic construction of brake 10 according to the preferred teachings of the present invention has been explained, some of the advantages of brake 10 can be set forth and appreciated. Specifically, brake 10 in the most preferred form includes friction element 30 having no moving parts and of a relatively small size which is mounted to sliding plate 16 and includes friction element 36 having moving parts mounted to base plate 14. This is advantageous for several reasons. First, the mass added to sliding plate 16 by the addition of friction element 30 is minimized in comparison to if friction element 36 were added to sliding plate 16 or if friction element 30 included movable parts. Thus, brake 10 according to the teachings of the present invention has minimal effect on the dynamics of linear motor 12 when brake 10 according to the teachings of the present invention is not engaged. Also, as friction element 30 does not include any moving parts, no cables or other controls or carriers therefor have to be connected to sliding plate 16 for purposes of operating brake 10 according to the preferred teachings of the present invention. As cables or other controls connected to sliding plate 16 must move with sliding plate 16, such cables or other controls are a common source of failure due to wear and material hardening due to bending. The only component of brake 10 according to the preferred teachings of the present invention which requires control is actuator 70 which is mounted to frame 38 and not sliding plate 16.

Brake 10 according to the teachings of the present invention does not utilize linear bearings and races 18 and 20 in the braking operation. In particular, prior attempts at braking linear motors 12 utilized calipers which releasably gripped linear races 20 which could result in uneven wear or other detraction in the efficiency of bearings 18 and races 20.

Brake 10 applies all braking force between friction elements 30 and 36 which are separate and spaced from linear bearings 18 and races 20. Additionally, as friction element 30 is sandwiched between a pair of oppositely moving caliper elements 54 in brake 10 in the preferred form of the present invention, side loading of linear bearings and races 18 and 20 is minimized especially in comparison to if a single caliper element 54 was engaged to a single surface of friction element 30.

In the most preferred form of the present invention, brake 10 is positioned externally of linear motor 12 spaced in a direction perpendicular to the linear motion direction and specifically parallel to but outside of linear bearings 18 and races 20 which in the preferred form shown is with friction elements 30 and 36 located on the opposite side of the first linear bearing 18 and race 20 than the other linear bearing 18 and race 20 and than armature 22 and magnet track 24. This is advantageous for several reasons. First, brake 10 can be easily marketed as an add on module for linear motor 12 of any design by addition of friction element 30 to sliding plate 16 and of friction element 36 to base plate 14. Also, if friction pads 34 should require replacement as the result of wear, fin 32 is simply disconnected from sliding plate 16 for ease of access to friction pads 34. In this regard, it should be appreciated that friction pads 34 could be removably secured to caliper elements 54 rather than and for engagement with fin 32. Additionally, a sealing mechanism could be easily placed along the top and ends of frame 38 such as a TEFLON™ seal or a bellows that would contain any particulates generated by brake 10 making it suitable for clean-room applications.

Additionally, the preferred construction of friction element 36 according to the teachings of the present invention is advantageous for several reasons. Specifically, as the mechanism for separating caliper elements 54 is located completely between caliper elements 54 so that the width of brake 10 perpendicular to the linear movement direction is minimized especially when compared to when the movement mechanism is positioned or extends outside of caliper elements 54. Additionally, the presence of recesses 60 for wave springs 58 as well as the counterbores of apertures 50 for washer and nut arrangements 52 also allow the minimization of the width of brake 10.

Furthermore, the use of cam followers 72 and in particular cam wedges 74 provides mechanical advantage for actuator 70 and directs the force of actuator 70 from a direction parallel to the linear movement direction to a direction perpendicular to the linear movement direction. Additionally, the force of the caliper elements 54 engaging friction element 30 is mechanically increased to be greater than the force applied by actuator 70 to reciprocate release bar 62. As a result, the power requirement and envelope size of actuator 70 are reduced. Also, as actuator 70 is aligned with release bar 62 and parallel to the linear movement direction, the width of brake 10 is minimized. Further, brake 10 according to the teachings of the present invention can be easily designed to substitute actuators 70 of differing types according to particular applications or end user tastes.

Brake 10 according to the preferred teachings of the present invention as shown is especially advantageous in its ability to place a clamping force on friction element 30 at a relatively constant amount independent of the linear position of sliding plate 16 and friction element 30 relative to base plate 14 and frame 38. In particular, a relatively large number of wave springs 58, cam followers 72 and wedges 74 can be provided along the axial length of brake 10 and at relatively short, constant intervals. Thus, friction element 30 will be engaged by caliper elements 54 by the same force at any position in its travel along caliper elements 54.

Thus since the invention disclosed herein may be embodied in other specific forms without departing from is the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

What is claimed is:

1. Brake for stopping linear motion of a first member relative to a second member for a distance along a linear movement direction comprising, in combination: a first friction element adapted to be secured to the first member, with the first friction element including opposite sides extending parallel to the linear movement direction; and a second friction element adapted to be secured to the second member, with the second friction element including first and second caliper elements in a spaced, parallel relation to each other and to the linear movement direction, with the first and second caliper elements including inner surfaces for engaging the opposite sides of the first friction element, with the first and second caliper elements being movable between an engaged position and a disengaged position, with the first and second caliper elements sandwiching the first friction element in the engaged position and being spaced from the first friction element in the disengaged position, with the first and second caliper elements being movable from the engaged position to the disengaged position by means located between and pressing against the inner surfaces of the first and second caliper elements for separating the first and second caliper elements.

2. The linear motion brake of claim 1 wherein the separating means comprises, in combination: a release bar positioned between the first and second caliper elements; means for reciprocating the release bar parallel to the linear movement direction; and means for causing the first and second caliper elements to move perpendicular to the linear movement direction as the result of reciprocation of the release bar.

3. The linear motion brake of claim 2 wherein the release bar is reciprocated with a force from the engaged position to the disengaged position; wherein the causing means moves the caliper elements with a force; and wherein the causing means comprises means for providing a mechanical advantage to increase the force of the first and second caliper elements over the force of the release bar.

4. The linear motion brake of claim 3 wherein the causing means comprises, in combination: at least a first wedge mounted to one of the caliper elements and the release bar, with the wedge having a cam surface extending at a non-parallel angle to the linear movement direction; and at least a first cam follower mounted to the other of the caliper elements and the release bar for engaging the cam surface of the wedge.

5. The linear motion brake of claim 4 wherein the caliper elements have a length in the linear movement direction substantially equal to the distance, with the first friction element having a length in the linear movement direction substantially shorter than the distance, with the causing means including a plurality of wedges and cam followers at spaced intervals along the release bar in the linear movement direction.

6. The linear motion brake of claim 2 wherein the second friction element further includes a U-shaped frame having first and second side plates, with the first and second caliper elements located between the first and second side plates, with the first and second caliper elements being biased from the disengaged position to the engaged condition by springs located between the first caliper element and the first side plate and between the second caliper element and the second side plate.

7. The linear motion brake of claim 2 wherein the reciprocating means comprises, in combination: a shaft hanger for slideably mounting a first end of the release bar; and an actuator attached to a second end of the release bar and for reciprocating the release bar.

8. The linear motion brake of claim 7 wherein the actuator is pneumatically operated.

9. The linear motion brake of claim 1 wherein the second friction element further includes a U-shaped frame having first and second side plates, with the first and second caliper elements located between the first and second side plates, with the first and second caliper elements being biased from the disengaged position to the engaged condition by springs located between the first caliper element and the first side plate and between the second caliper element and the second side plate.

10. The linear motion brake of claim 9 wherein the second friction element further includes a plurality of standoffs extending between the first and second side plates; and wherein the first and second caliper elements including apertures for slideable receipt of the standoffs for being slideably mounted thereby.

11. Linear motion device comprising, in combination: a base plate; a sliding plate; a linear motor including first and second linear bearings mounted on one of the base plate and sliding plate and first and second linear races mounted on the other of the base plate and sliding plate for allowing linear motion of the sliding plate relative to the base plate in a linear movement direction for a distance, a stator mounted to the base plate, and an armature mounted to the sliding plate and cooperating with the stator for driving the sliding plate relative to the base plate; and a linear brake including a first friction element secured to the sliding plate spaced from and parallel to the linear bearings and races, and a second friction element secured to the base plate spaced from and parallel to the linear bearings and races, with the second friction element having a length in the linear movement direction substantially equal to the distance, with the first and second friction elements being movable between an engaged position for stopping movement of the sliding plate relative to the base plate and a disengaged position which does not impede movement of the sliding plate relative to the base plate.

12. The linear motion device of claim 11 wherein the linear brake is located externally of the linear motor spaced generally perpendicular to the linear movement direction.

13. The linear motion device of claim 12 wherein the first friction element includes opposite sides extending parallel to the linear movement direction, with the second friction element including first and second caliper elements in a spaced, parallel relation to each other and to the linear movement direction, with the first and second caliper elements including inner surfaces for engaging the opposite sides of the first friction element, with the first and second caliper elements sandwiching the first friction element in the engaged position and being spaced from the first friction element in the disengaged position.

14. The linear motion device of claim 13 wherein the first and second caliper elements are movable from the engaged position to the disengaged position by means located between and pressing against the inner surfaces of the first and second caliper elements for separating the first and second caliper elements.

15. The linear motion device of claim 14 wherein the second friction element further includes a U-shaped frame having first and second side plates, with the first and second caliper elements located between the first and second side plates, with the first and second caliper elements being biased from the disengaged position to the engaged condition by springs located between the first caliper element and the first side plate and between the second caliper element and the second side plate.

16. The linear motion device of claim 15 wherein the second friction element further includes a plurality of standoffs extending between the first and second side plates; and wherein the first and second caliper elements including apertures for slideable receipt of the standoffs for being slideably mounted thereby.

17. The linear motion device of claim 15 wherein the separating means comprises, in combination: a release bar positioned between the first and second caliper elements; means for reciprocating the release bar parallel to the linear movement direction; and means for causing the first and second caliper elements to move perpendicular to the linear movement direction as the result of reciprocation of the release bar.

18. The linear motion device of claim 17 wherein the causing means comprises, in combination: at least a first wedge mounted to one of the caliper elements and the release bar, with the wedge having a cam surface extending at a nonparallel angle to the linear movement direction; and at least a first cam follower mounted to the other of the caliper elements and the release bar for engaging the cam surface of the wedge.

19. The linear motion device of claim 14 wherein the separating means comprises, in combination: a release bar positioned between the first and second caliper elements; means for reciprocating the release bar parallel to the linear movement direction; and means for causing the first and second caliper elements to move perpendicular to the linear movement direction as the result of reciprocation of the release bar.

20. The linear motion device of claim 19 wherein the causing means comprises, in combination: at least a first wedge mounted to one of the caliper elements and the release bar, with the wedge having a cam surface extending at a nonparallel angle to the linear movement direction; and at least a first cam follower mounted to the other of the caliper elements and the release bar for engaging the cam surface of the wedge.

* * * * *

UNITED STATES PATENT AND TRADEMARK OFFICE
CERTIFICATE OF CORRECTION

PATENT NO. : 6,135,029
DATED : October 24, 2000
INVENTOR(S) : Karl W. Oberjohn

Page 1 of 1

It is certified that error appears in the above-identified patent and that said Letters Patent is hereby corrected as shown below:

<u>Title page,</u>
Item [56], after "4,300,664   11/1981   Helm et al. . . . 188/265", insert
-- 4,615,515          10/1986         Suzuta et al. --.
After "5,829,811      11/1998         Skinner, II . . . . 294/88", insert
-- 5,950,773          09/1999         Ito. --.
After "FOREIGN PATENT DOCUMENTS", insert
-- 1150619            05/1956         France. --.

Signed and Sealed this

Nineteenth Day of March, 2002

Attest:

JAMES E. ROGAN
*Attesting Officer*   *Director of the United States Patent and Trademark Office*